United States Patent [19]

Ross, Jr. et al.

[11] Patent Number: 4,483,367

[45] Date of Patent: Nov. 20, 1984

[54] STOP FILL VALVE

[75] Inventors: Herbert G. Ross, Jr., Carrollton; Robert E. Hrncir, Dallas, both of Tex.

[73] Assignee: Rochester Gauges, Inc., Dallas, Tex.

[21] Appl. No.: 572,408

[22] Filed: Jan. 20, 1984

[51] Int. Cl.³ .................. F16K 31/20; F16K 37/00; F16K 33/00

[52] U.S. Cl. .................. 137/416; 73/307; 73/317; 116/229; 141/95; 141/198; 141/DIG. 1; 137/425; 137/446; 137/558

[58] Field of Search .............. 116/228, 229; 73/307, 73/317; 141/95, 198, DIG. 1; 137/416, 425, 393, 434, 446, 558; 251/74, 75, 65

[56] References Cited

U.S. PATENT DOCUMENTS

| | | | |
|---|---|---|---|
| 2,634,608 | 4/1953 | Sorber | 73/305 |
| 2,697,350 | 12/1954 | Sorber | 73/317 |
| 3,339,519 | 9/1967 | Taylor et al. | 73/317 |
| 3,688,795 | 9/1972 | Taylor | 73/317 |
| 3,756,269 | 9/1973 | Brown | 137/446 |
| 4,064,907 | 12/1977 | Billington et al. | 137/446 |
| 4,142,552 | 3/1979 | Brown et al. | 137/446 |
| 4,313,459 | 2/1982 | Mylander | 137/393 |

Primary Examiner—George L. Walton
Attorney, Agent, or Firm—Richards, Harris & Medlock

[57] ABSTRACT

A direct indicating automatic stop fill valve is mounted to the inlet to an LPG tank whereby inlet ports to the tank volume are covered by a slidably mounted cylinder which is raised through contact with a float/cam arrangement until the tank level reaches a predetermined level. The cylinder is then driven into a sealing position to stop the flow into the tank by a differential pressure force resulting from the inlet pressure being higher than tank fluid pressure. The cylinder also supports a drive magnet for actuating a gauging mechanism to visibly indicate the open or closed status of the stop fill valve.

15 Claims, 9 Drawing Figures

STOP FILL VALVE

TECHNICAL FIELD

The present invention pertains in general to valve mechanisms and in particular to a valve for stopping the flow of fluid into a tank when the fluid in the tank reaches a predetermined level.

BACKGROUND OF THE INVENTION

Liquified petroleum gas (LPG) such as butane and propane are particularly good fuels because of the clean combustion and the relatively high heat content for the weight. These fuels can easily be transported and stored in relatively inexpensive tanks which are also referred to as bottles. The fuel is stored as a liquid but its boiling point is lower than the typical ambient temperature. Therefore, there is a continual production of vapor under pressure. This pressurized vapor can easily and conveniently be burned to produce heat. Further, the vapor pressure at typical ambient temperatures is not so great as to require an extremely strong and expensive storage tank. As a result, the liquified fuel can be stored and transported in relatively inexpensive containers.

However, such fuels in the liquid state have a substantial coefficient of expansion. This expansion can produce extremely high pressures which can be much greater than the vapor pressure of the gas. It is therefore important that the storage tanks not be completely filled with fluid, since expansion of the fluid could rupture the tank. To prevent this problem the tank is not completely filled. There is left at the top of the tank a void termed a "head space". This space is made sufficiently large to absorb the maximum possible thermal expansion of the fluid.

A number of practices have been used in the past to insure the proper filling of propane and butane tanks. One method is for the operator to weigh the tank while it is being filled and turn off the service valve when the appropriate weight for the tank is reached. This requires that the operator know the weight and volume of the tank in advance and that he carefully monitor the filling to stop the input of flow at the appropriate time. Another method makes use of an overflow tube. This is a tube that extends into the tank down to the desired fluid level. When the fluid in the tank reaches this level, the fluid will be forced out through this tube into the air where it evaporates and produces a white cloud of vapor which indicates that the desired fluid level has been reached. The operator must then immediately shut off the service valve to prevent any further fluid from entering the tank. Both of these techniques require careful attention on the part of the operator to prevent the tanks from being excessively filled into the head space.

As a result of potential operator errors in the filling of LPG tanks, it has been recognized that there is a need for an automatic shut off valve to insure that the proper level of fluid is stored in the tank. One such valve is shown in U.S. Pat. No. 4,313,459 to Mylander. However, the automatic shutoff valves developed to date have not been able to meet all of the operational and regulatory requirements to make possible widespread use of such devices.

In response to the critical filling requirements for LPG tanks and the potential for very widespread use of such tanks by consumers, there have been developed regulations and performance standards which must be met by manufacturers and users of LPG. These standards include the minimum size of the head space as well as maximum leakage rates for an automatic shut off valve. In view of the consumer demands for LPG usage and the standards which have been set for such equipment, there exists a need for a stop fill valve which can reliably and effectively serve as an automatic shut off under a wide range of conditions while at the same time meeting the required standards, including maximum leakage rates.

SUMMARY OF THE INVENTION

A selected embodiment of the present invention comprises a stop fill valve for stopping the flow of a fluid into a tank when the fluid in the tank reaches a predetermined level. The valve includes a cylindrical body which is mounted to the tank at an opening therein whereby the body extends into the interior of the tank. The body has an axial bore extending partially along the length of the body for receiving fluid from the opening. At least one port extends through the side of the body in fluid communication with the bore for delivering fluid from the bore into the tank. The body further has a shoulder at the lower end thereof opposite the tank opening from the port. A power cylinder is slidably mounted on the exterior of the cylindrical body over the shoulder to form an annular space between the cylinder and the body. The cylinder has a lip at one end thereof for contacting the exterior of the cylindrical body for closing the annular space wherein the cylinder is driven upward to enclose the port and stop the flow of the fluid into the tank when the annular space is open to receive pressurized fluid from the port. The cylinder also has a shoulder at the upper end thereof which supports a drive magnet for operating a gauging mechanism to give a direct indication of the fluid level in the tank and the operational status of the stop fill valve. A shaft is connected to extend downward from the body. A pivot is mounted on the lower portion of the shaft, offset from the body. A lift member is slidably mounted on the shaft for lifting the power cylinder toward the cylindrical body. The lift member is not connected to the power cylinder. A cam is mounted on the pivot and a float member is mounted on the cam. As the fluid rises in the tank, there is a movement of the float member about the pivot toward the body such that the cam drives the lift member toward the body. This in turn lifts the power cylinder to open the annular space to the port when the fluid level in the tank reaches the predetermined level. The power cylinder also lifts the drive magnet to a position that causes a needle in the gauging mechanism to visibly indicate that the predetermined fluid level has been reached. The power cylinder is then driven upward to cover the port and stop the flow of fluid into the tank. When the power cylinder is driven upward it also lifts the drive magnet to cause the gauging mechanism to indicate that the stop fill action has occurred and to indicate to the operator that the filling process should be discontinued.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
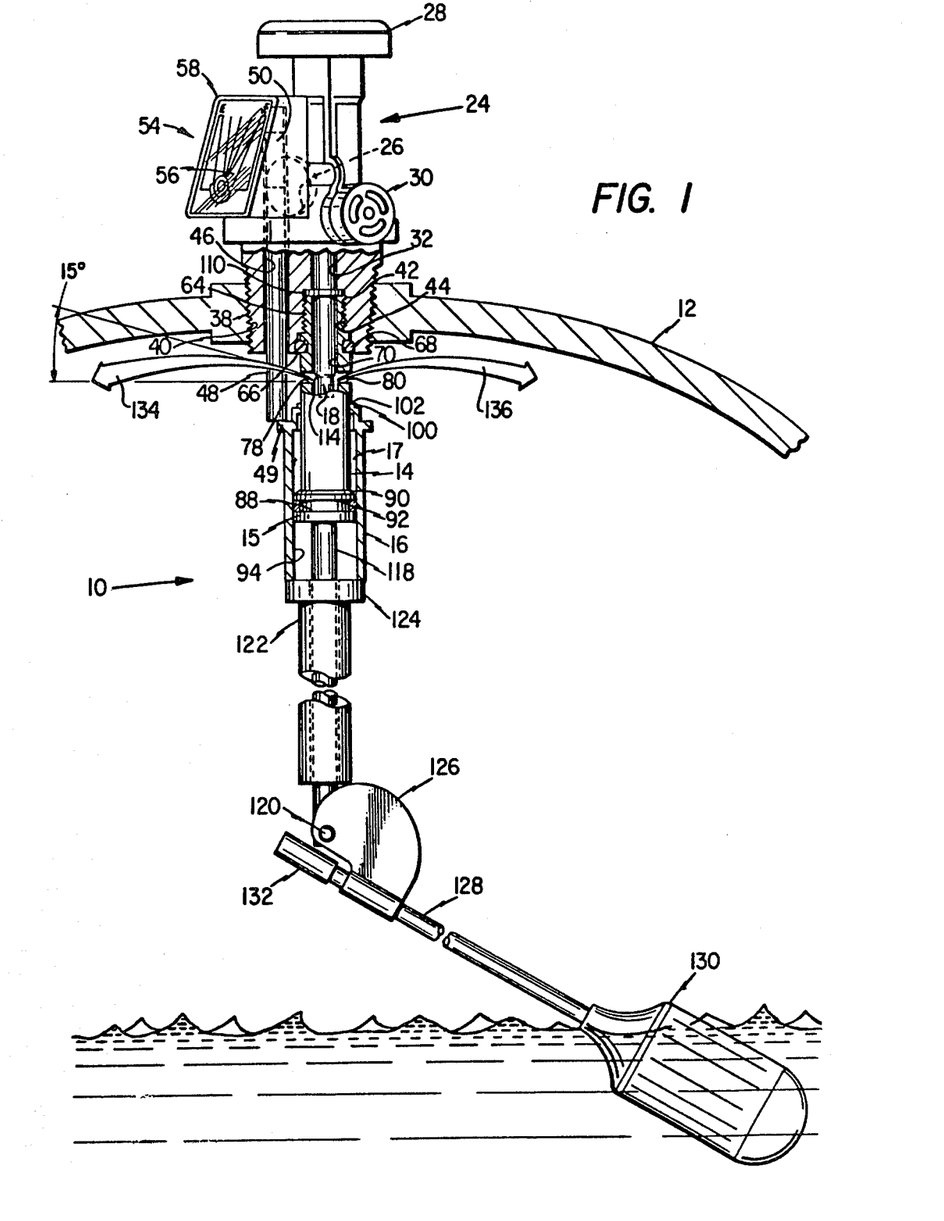
FIG. 1 is an elevation view in partial section of the stop fill valve of the present invention in the open position wherein fluid is permitted to enter into the tank through the valve.
Figure 2:
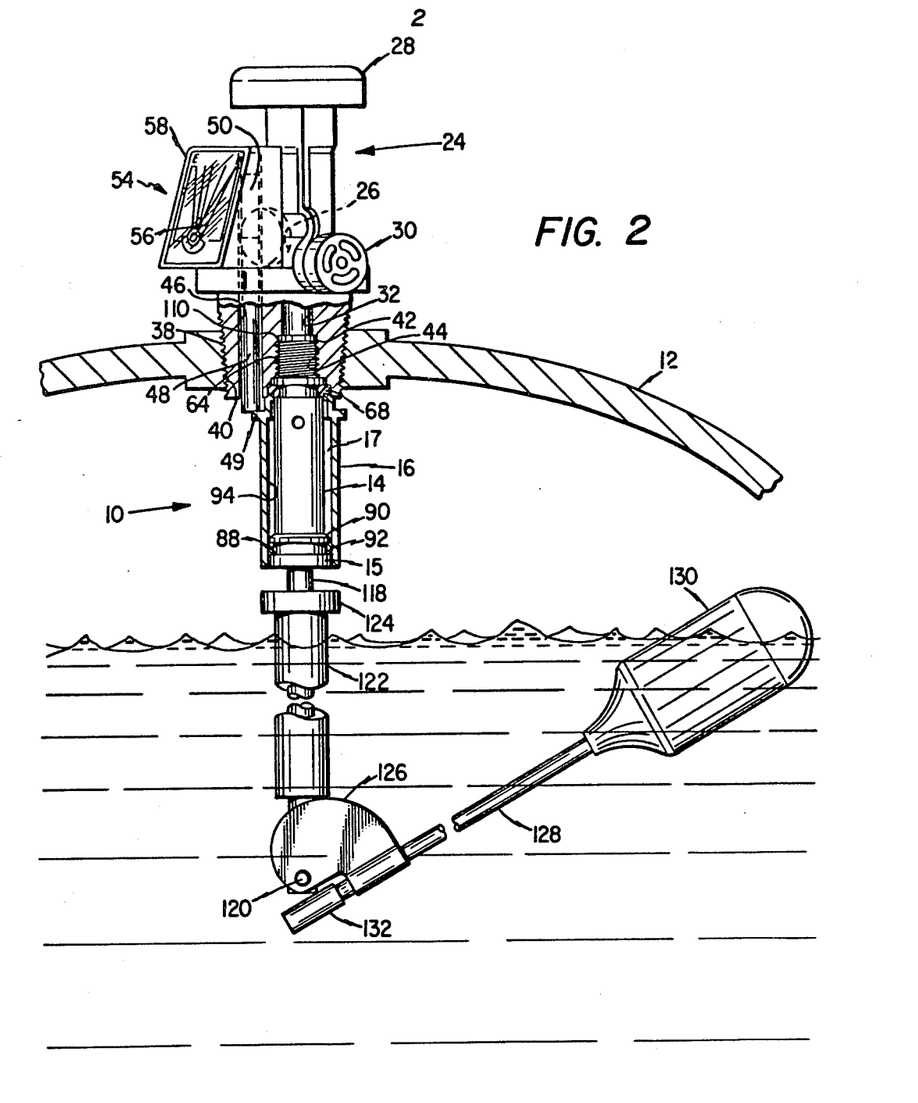
FIG. 2 is an elevation view in partial section of the stop fill valve of the present invention wherein the fluid level has reached a level such that the valve has shut off the flow of fluid into the tank.

A stop fill valve in accordance with the present invention is illustrated in FIGS. 1 and 2. The valve is shown in the open position in FIG. 1 and in the closed position in FIG. 2. Elements of the valve are illustrated in detail in FIGS. 3, 4, 5, 6, 7 and 8.

Referring now to FIG. 1 there is shown a stop fill valve 10 which is in the open position to permit the flow of fluid into a tank 12. The valve 10 includes a main support 14 which also provides a fluid flow outlet into the tank 12. The main support 14 is basically a cylindrical body. The support 14 is shown in further detail in FIG. 4. At the lower end of the support 14 there is provided a support shoulder 15 which is in the form of a circular flange having a greater diameter than the main cylindrical body of the support 14. A power cylinder 16 is slideably mounted on the exterior of support 14 over the shoulder 15 to form an annular space 17 between the main support 14 and the power cylinder 16. The cylinder 16 is shown in greater detail in FIG. 3. A redirection flow tube 18 is mounted within the main support 14 and serves to control the direction of fluid flow therethrough. The flow tube 18 is shown in further detail in FIG. 5.

The fuel which is stored in the tank 12 is introduced into the tank and removed from it through a service valve 24. A service valve opening 26 is threaded to provide a connection to receive liquified fuel and deliver vapor to a user device. The flow of fluid and vapor through the valve 24 is controlled by operation of a service valve handle 28. A relief valve 30 is connected to the service valve 24 to release fluid from the tank 12 in the event that the tank becomes overpressurized.

On the interior of the valve 24 there is a filling and withdrawing passage 32 which provides fluid and vapor communication with the tank 12 through the valve 24.

The valve 24 is provided with valve boss external threads 38 which are engaged to a threaded opening 40 in the tank 12.

At the lower end of the passage 32 the valve 24 is provided with a filling passage shoulder 42. Immediately below the shoulder 42 the valve 24 has a threaded opening 44.

The valve 24 further includes a vertical, elongate opening 46 which receives a magnet lift tube 48 which is supported by a shoulder 49 of the power cylinder 16.

The lift tube 48 supports a magnet 50 which is also located in the opening 46. Within a gauge 54 a pivoted pointer 56 is provided with a magnet segment 56a that interacts with the magnet 50. The pointer 56 is mounted within a dial chamber 58 wherein the pointer 56 indicates the amount of fluid stored in the tank 12 as indicated by a gauge scale 57 (see FIG. 7). The pointer 56 also indicates the operational status of the stop fill valve 10 and visibly alerts the filling operator when the predetermined fluid level in the tank has been reached. The gauge 54 and pointer 56 are further described in FIGS. 6 and 7.

Figure 4:
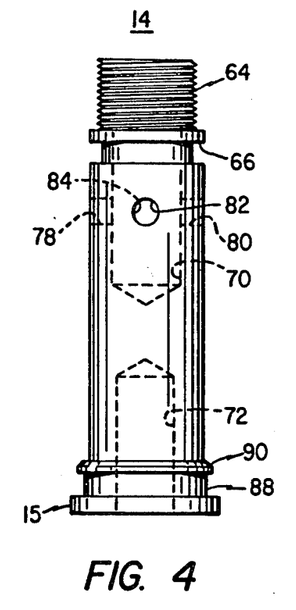
FIG. 4 is an elevation view of the cylindrical body shown in FIGS. 1 and 2.

Referring further to FIG. 1, and in addition, to FIG. 4, the main support 14 has external threads 64 at the upper end of the support and these threads engage the threaded opening 44. Just below the threads 64, the main support 14 is provided with an O-ring groove 66 which receives an O-ring 68. The main support 14 has an upper axial bore 70 which extends from the threaded end of the support 14 and is terminated at approximately the middle of the support. The support 14 further includes a lower axial bore 72 which opens at the lower end of the support 14 and is terminated at approximately one third of the length of the bore. The bores 70 and 72 are not open to each other.

The main support 14 has a plurality of filling and pressurizing ports 78, 80, 82 and 84. The ports 78–84 extend through the wall of the support 14 to open into the bore 70. The ports 78–84 are arranged symmetrically about the axis of the support 14. The preferred arrangement of the ports 78–84 is illustrated. However, in the general sense of the present invention, there need be only at least one such port.

At the lower end of the main support 14, adjacent to the shoulder 15, there is formed a groove 88 between the support shoulder 15 and a retaining shoulder 90. Within the groove 88 there is mounted a lip seal ring 92. When the lip seal ring 92 is pressurized from the interior of the annular space 17, the seal ring 92 is forced outward and forms a pressure seal between the groove 88 on main support 14 and an interior bore 94 on the power cylinder 16. The lip seal ring 92 is shown in detail in FIGS. 8 and 9.

Figure 3:
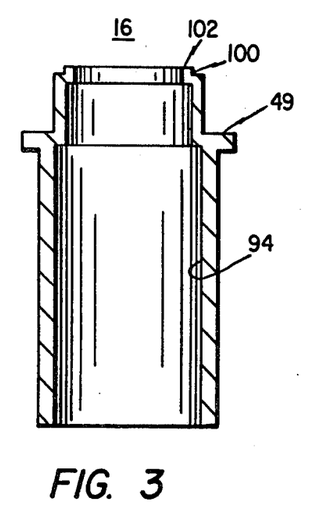
FIG. 3 is an elevation view of the power cylinder shown in FIGS. 1 and 2.

Referring further to FIG. 1, and also to FIG. 3, the power cylinder 16 has a seal neck 100 which fits closely about the exterior cylindrical surface of the main support 14. The very upper end of the power cylinder 16 comprises a cylinder shoulder seat 102 which is adapted to engage the O-ring 68 and form a pressure seal between the main support 14 and the power cylinder 16.

Figure 5:
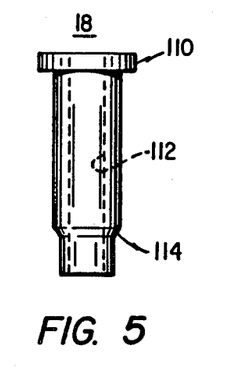
FIG. 5 is an elevation view of the redirectional flow tube which is included as a part of the stop fill valve shown in FIGS. 1 and 2.

The redirection flow tube 18 is now further described in reference to FIG. 1 and FIG. 5. At the upper end of the tube 18 there is provided a shoulder 110 which engages the filling passage shoulder 42 of the valve 24. The tube 18 has a central opening 112 which extends through the length thereof. The outer surface of the tube 18 has a greater diameter along the central portion thereof and a lesser diameter at the lower portion. The transition between the two outer portions is at a flow radius 114. The radius 114 is positioned at approximately the center of the ports 78–84 while the lower end of the tube 18 extends below the ports toward the closed end of the bore 70. The radius 114 is designed to direct the fluid flow upward and outward through the ports 78–84 at an angle of approximately 15° above the horizontal so that the operation of the power cylinder 16 is not adversely effected by the impact of the discharging fluid from the ports 78–84.

Returning now to FIGS. 1 and 4, a support shaft 118 is fitted within the bore 72 for connection to the main support 14. At the lower end of the support shaft 118 there is provided an adjustable pivot 120. The pivot 120 can be adjusted to be located at different points along the length of the shaft 118 to calibrate the stop fill valve 10. A lift sleeve 122 is slideably mounted on the support shaft 118. A lift washer 124 is slideably mounted on the shaft 118 above the sleeve 122. The diameter of the washer 124 is approximately the same as that of the power cylinder 16 such that the washer 124 can support the cylinder 16. The sleeve 122 and washer 124 together comprise a lift member.

A cam 126 is mounted on the pivot 120 and is further connected to a float rod 128. At a first end of the rod 128 there is connected a float 130 and at the opposite end of the rod 128 there is connected a counterbalance 132. The curved surface of the cam 126 contacts the lower end of the lift sleeve 122. The combination of rod 128, float 130 and counterbalance 132 comprises a float assembly.

When the float rod 128 is in a downward, vertical position, the sleeve 122 is at its lowest position. As the float 130 rises in the tank 12, the rod 128 moves counterclockwise about the pivot 120. As the cam 126 moves counterclockwise about the pivot 120, the lift sleeve 122 is moved upward by the action of the cam 126.

Figure 6:
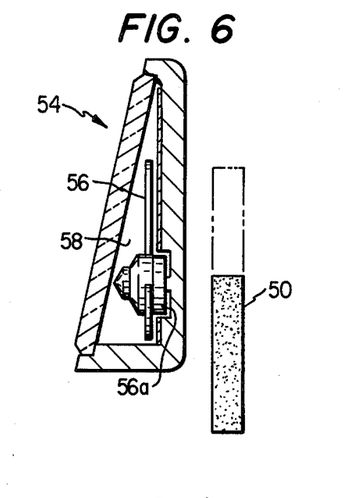
FIG. 6 is an elevation view of the gauge shown in FIG. 1.
Figure 7:
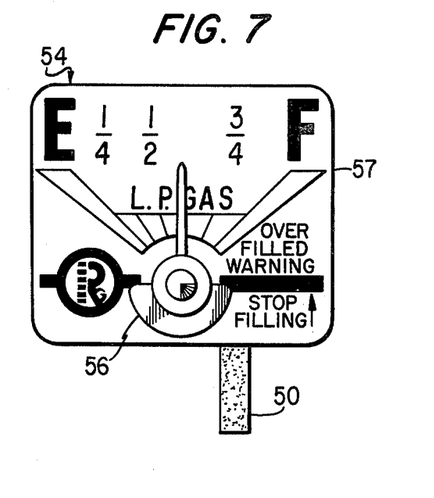
FIG. 7 is an elevation view of the needle and gauge mechanism within the gauge shown in FIG. 1.

The gauge 54 and related components are shown in FIGS. 6 and 7. The dial pointer 56 is within the dial chamber 58 of the gauge 54. The dial pointer 56 is positioned due to the force on a magnet 56a as a result of the change in position of the magnet 50.

Figure 8:
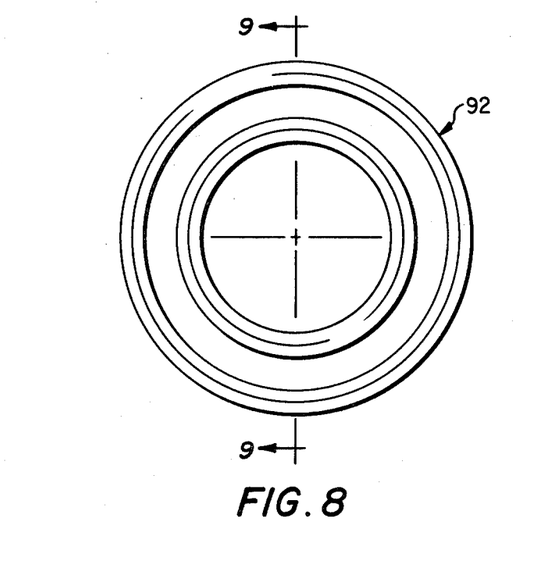
FIG. 8 is a plan view of the lip seal shown in FIG. 1.
Figure 9:
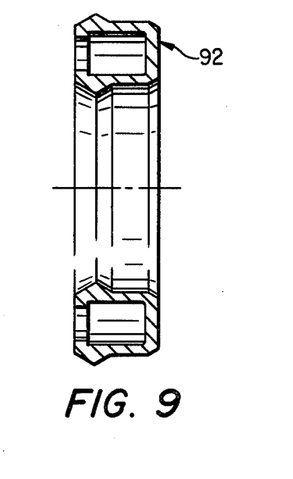
FIG. 9 is a section view of the lip seal shown in FIG. 8.

The lip seal ring 92 is shown in plan and elevation views in FIGS. 8 and 9.

The operation of the stop fill valve 10 is now described in reference to FIGS. 1 and 2. FIG. 1 illustrates the position of the stop fill valve 10 when the tank 12 is being filled with fluid. A pressurized LPG supply is connected to the opening 26 of the service valve 24. The valve 24 is opened to permit a flow of fluid through the opening 26 into the passage 32. The fluid travels from passage 32 through the redirection flow tube 18 where it is directed into the bore 70 below the ports 78-84. The fluid then travels between the tube 18 and the wall of the bore 70 upward where it is redirected by the flow radius 114 outward through the ports 78-84. The redirected fluid flow passing through the ports 78-84 has an upward and outward flow direction as shown by arrows 134 and 136. The upward redirection of the fluid flow as a result of the flow through the tube 18 not only reduces the hydrodynamic fluid pressure which would otherwise be applied to the power cylinder 16, but aids in lifting the power cylinder 16 due to the contribution of the hydrodynamic force upward on the interior of the surface of cylinder 16 from the redirected flow. This in turn, reduces the force needed to lift the power cylinder 16. In prior art stop fill valves, such as shown in the Mylander patent cited above, the fluid flow, when filling the tank, has impacted the power cylinder to disrupt the operation of the power cylinder.

The preferable configuration of the ports 78-84 is a symmetrical arrangement about the axis of the main support 14. When the tank 12 is being filled, the pressurized fluid directed through the ports 78-84 has a tendency to form a fountain extending upward from the bottom center of the tank. Since the float 130 is offset from the center of the tank 12, the fountain produced by the input flow does not push the float 130 upward which could cause the production of a false signal indicating that the tank 12 is full. In prior art devices which have had a float in the center of the tank, it has been necessary to distort the fluid flow by having an unsymmetrical arrangement of fluid ports to offset the fountain from the center of the tank. An unsymmetrical arrangement of the filling ports can also be used with the stop fill valve of the present invention but the detrimental effect is substantially reduced due to the greater float travel required to activate the stop fill valve utilizing the float/cam arrangement of the present invention. But with the symmetrical arrangement a further advantage is achieved with the present invention in that the fluid is uniformly directed on the interior of the tank 12 to provide a shower-cooling effect which allows the tank to be filled fully and quickly to the correct level. Therefore, the present stop fill valve 10 provides much greater flexibility in the positioning, size and number of fill ports.

As the fluid level rises in the tank 12, the float 130 is likewise raised toward the top of the tank. As the float 130 rises, the cam 126 rotates about the pivot 120, thereby lifting the sleeve 122. This in turn raises the washer 124 which lifts the power cylinder 16. When the lip of the seal neck 100 reaches the ports 78-84, the pressurized fluid is directed into the annular space 17 between the exterior of the main support 14 and the interior bore 94 of the power cylinder 16. A differential pressure is developed between the annular space 17 and the interior of the tank 12. This pressure differential tends to drive the power cylinder 16 upward toward the top of the tank 12 while sliding along the main support 14. When the power cylinder 16 moves upward it covers up approximately one-half of the ports 78-84, the differential pressure force exceeds all forces restraining the cylinder 16 and the resulting force drives the power cylinder 16 as far as it will travel upward until the shoulder seat 102 engages the O-ring 68 to form a positive seal between the main support 14 and the power cylinder 16 at the upper end. At the lower end of the main support 14 the seal ring 92 forms a positive seal between the main support 14 and the power cylinder 16 so that fluid flow into the tank 12 out of ports 78-84 in main support 14 is sealed off.

The stop fill valve 10 is shown in the closed position in FIG. 2. Note that the power cylinder 16 has lifted from the washer 124. Since the cylinder 16 is not connected to the float assembly and lifting elements, there is a substantial reduction in the weight that must be overcome by the power cylinder 16 to shut off the input fluid flow. This also eliminates the need for any counterbalance spring which would serve to aid in lifting the cylinder 16. The absence of this added weight allows the power cylinder 16 to close in a snap action to rapidly shut off the input flow and firmly seat the power cylinder 16 against the O-ring 68 and together with the seal ring 92 form a tight seal such that there is practically no leakage.

After the tank 12 has been filled and the valve 10 is snapped closed, the magnet lift tube 48 is moved upward due to contact with the power cylinder shoulder 49. Tube 48 lifts the magnet 50 which causes the pointer 56 to be deflected to indicate that the tank 12 is full and that the stop fill valve 10 has been activated. Magnet 50 can optionally activate a reed switch to electronically indicate that the tank 12 has been filled to the predetermined level.

After the tank 12 has been filled, the LPG source is disconnected from the service valve 24 and a user device is connected to the opening 26. A typical user device is a heater or cooking stove. When the supply line to the user device is opened, there will be a reduction of pressure within the passage 32. This in turn reduces the pressure within the annular space 17 between the support 14 and cylinder 16. As the pressure is reduced within the annular space 17, the greater pressure within the tank 12 causes the power cylinder 16 to be driven downward. The cylinder 16 drops downward until it rests upon the washer 124 thereby opening the ports 78–84 to the interior of the tank 12. The magnet lift tube 48 drops down with the cylinder shoulder 49 which lowers the magnet 50 which in turn causes the pointer 56 to indicate if the tank has been overfilled and also to indicate the status of the stop fill valve 10 itself. The vapor within the tank 12 is then permitted to flow through the ports 78–84 into the passage 32, through the service valve 24 into the user's supply line.

Advantages of the present invention become apparent when considering the case where the liquid level in the tank rises due to expansion of the fluid as a result of an increase in temperature. The typical fluid, LPG, has a substantial coefficient of expansion. The cam 126 is designed such that at maximum float travel upward, the cam 126 will cause the cylinder seal neck 100 to almost completely cover up the ports 78–84 while not engaging the O-ring 68. The advantage of using the lip seal ring 92 is that it is a one-way seal from the interior to the exterior, and when the pressure on the exterior of cylinder 16 is greater than that on the interior, as in the case for LPG thermal expansion, this greater pressure pushes the lip seal 92 away from the interior bore 94 of the cylinder 16 to permit leakage past the seal 92. Since the cylinder shoulder seat 102 does not engage the O-ring 68, there is sufficient leakage between the seal seat 102 and the main support 14 and past the lift seal 92 into the annular space 17 and through ports 78–84 into the passage 32 to permit operation of the relief valve 30 should the tank 12 become critically overpressurized.

The stop fill valve 10 is fabricated to be a size such that it can pass through the opening 44 without disassembly.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

We claim:

1. A stop fill valve for stopping the flow of a fluid into a tank when the fluid in the tank reaches a predetermined level, comprising:
    a cylindrical body mounted to said tank at an opening therein and extending into the interior of said tank, said body having an axial bore extending partially along the length of said body for receiving fluid from said opening, said body having at least one port extending through the side thereof and in fluid communication with said bore for delivering said fluid from said bore into said tank, said body further having a shoulder opposite said opening from said port;
    a cylinder slidably mounted on the exterior of said cylindrical body over said shoulder to form an annular space between said cylinder and said body, said cylinder having a lip at one end thereof for contacting the exterior of said body for closing said annular space, wherein said cylinder is driven by the pressure of said fluid to enclose said port and stop the flow of said fluid into said tank when said annular space is open to receive said pressurized fluid from said port;
    a shaft connected to and extending downward from said body;
    a pivot mounted on said shaft offset from said body;
    a lift member slidably mounted on said shaft for lifting said cylinder toward said cylindrical body, said lift member is disconnected from said cylinder and elevated above said lift member when said cylinder is driven by said pressurized fluid;
    a cam mounted to said pivot;
    a float assembly mounted to said cam wherein movement of said float assembly about said pivot toward said body causes said cam to drive said lift member toward said body which in turn lifts said cylinder to open said annular space to said port when said fluid in said tank has reached said predetermined level wherein said float assembly is not lifted by said cylinder when said cylinder is driven by said pressurized fluid.

2. A stop fill valve as recited in claim 1 including means mounted within said cylindrical body for directing the flow of said fluid through said port away from said cylinder.

3. A stop fill valve as recited in claim 2 wherein said means for directing comprises a tubular member located in said bore for passing said fluid therethrough into said bore, the lower end of said tubular member positioned between the closed end of said bore and said port.

4. A stop fill valve as recited in claim 1 including a plurality of said ports for passing said fluid from said bore into said tank.

5. A stop fill valve as recited in claim 4 wherein said ports are positioned symmetrically about the axis of said cylindrical body.

6. A stop fill valve as recited in claim 1 wherein said lifting member comprises:
    a lift sleeve having said shaft extending coaxially therethrough, and
    a lift washer having said shaft extending coaxially therethrough and positioned between said lift sleeve and said body, said lift washer having a sufficient diameter to support said cylinder.

7. A stop fill valve as recited in claim 1 further including an O-ring and wherein said cylindrical body includes a groove for receiving said O-ring wherein said O-ring seals said lip of said cylinder to the exterior of said cylindrical body to reduce leakage of said fluid from said annular space into said tank.

8. A stop fill valve as recited in claim 1 further including a seal ring mounted on said cylindrical body adjacent said shoulder for sealing said cylinder with said cylindrical body.

9. A stop fill valve as recited in claim 1 including a second axial bore in said cylindrical body opposite said first bore, said second bore adapted to receive said shaft for connecting said shaft to said cylindrical body.

10. A stop fill valve as recited in claim 1 wherein said float assembly comprises:
    a rod connected to said cam,
    a float connected to said rod outward from said cam, and a counterbalance connected to said rod opposite said cam from said float.

11. A stop fill valve for stopping the flow of a fluid into a tank when the fluid in the tank has reached a predetermined level, comprising:

an elongate, cylindrical body mounted in an opening into said tank and extending downward in a vertical direction into the interior of said tank, said body having a first axial bore extending upward partially along the length of said body and open at the top of said body to receive fluid from said opening, said body having a plurality of ports symmetrically positioned about the axis of said body and transverse to said bore wherein said ports are in fluid communication with said bore for delivering said fluid from said bore into said tank, said body having a shoulder on the end thereof opposite said first bore, said body having a second axial bore open at the lower end of said body, said body further having a first circumferential groove above said ports and a second circumferential groove adjacent said cylindrical body shoulder, a tubular member having a shoulder at the top end thereof for supporting said tubular member within said first bore for transmitting said fluid from opening said tank into said bore, the lower end of said tubular member located between said ports and the closed end of said first bore, wherein said fluid received through said tubular member is directed outward and upward through said ports, a power cylinder slidably mounted on the exterior of said cylindrical body over said shoulder thereof to form an annular space between said power cylinder and said body, said power cylinder having a lip at the upper end thereof for contacting the exterior of said body for closing said annular space, wherein said power cylinder is driven upward by the pressure of said fluid to enclose said ports and stop the flow of said fluid into said tank when said annular space is open to receive said pressurized fluid from any of said ports, an O-ring located in said first groove for sealing said power cylinder lip with the exterior of said cylindrical body, a ring seal located in said second groove for sealing said cylindrical body flange with the interior surface of said power cylinder, a shaft connected into the second bore of said body and extending downward in said tank, a pivot mounted on said shaft near the lower end thereof, a lift sleeve slidably mounted on said shaft, a lift washer slidably mounted on said shaft above said lift sleeve, said lift washer having a diameter sufficient to support said power cylinder, said lift washer is disconnected from said power cylinder which is elevated above said lift washer when said power cylinder is driven by said pressurized fluid, a cam mounted on said pivot, said cam having a surface for driving said lift sleeve upward when said cam is rotated upward about said pivot, a rod connected at a first end to said cam, and a float connected to the second end of said rod wherein upward movement of said float as said tank is filled with said fluid causes said cam to drive said lift sleeve and said lift washer upward which in turn lifts said power sleeve upward on said cylindrical body to open said annular space to at least one of said ports thereby driving said power sleeve upward to enclose said ports when said fluid has reached said predetermined level thereby stopping the flow of said fluid into said tank wherein said cam, said rod and said float are not lifted by said power cylinder when said power cylinder is driven by said pressurized fluid.

12. The stop fill valve recited in claim 11 including a float counterbalance mounted on said rod opposite said cam from said float.

13. The stop fill valve recited in claim 11 wherein there are four of said ports arranged symmetrically about the axis of said cylindrical body.

14. The stop fill valve recited in claim 11 wherein said tubular member has a lesser diameter below said ports and a greater diameter above said ports.

15. A direct indicating automatic stop fill valve for stopping the flow of a fluid into a tank when the fluid in the tank reaches a predetermined level, wherein the stop fill valve utilizes a service valve for manually controlling flow into and out of the tank, comprising:

a cylindrical body mounted to said service valve at an opening therein and extending into the interior of said tank, said cylindrical body having an axial bore extending partially along the length of said cylindrical body for receiving fluid from said opening, said cylindrical body having a plurality of ports positioned about the axis of said cylindrical body and extending through the side thereof and in fluid communication with said bore for delivering said fluid from said bore into said tank, said cylindrical body further having a shoulder opposite said opening from said ports;

a cylinder slidably mounted on the exterior of said cylindrical body over said shoulder to form an annular space between said cylinder and said cylindrical body, said cylinder having a support means at the upper end thereof;

actuator means supported on said support means;

an indicating device which includes a dial and a pivoted indicator that is responsive to said actuator means, wherein said indicating device shows both the fluid level in said tank and the open or closed status of said stop fill valve;

directing means within said cylindrical body for directing fluid flow upward and outward through said ports away from said cylinder;

a lip at one end of said cylinder for contacting the exterior of said cylindrical body;

seal means located at offset positions on said cylindrical body above and below said parts for closing said annular space; and a float assembly connected to said cylindrical body for moving said cylinder relative to said cylindrical body in proportion to the fluid level in said tank whereby said cylinder moves said actuator means which causes said pivoted indicator to move to show the fluid level in said tank and the open or closed status of said stop fill valve, wherein when said predetermined level is reached said cylinder is positioned to open said annular space to receive said fluid from said ports at higher than tank pressure to produce a pressure differential that results in a force raising said cylinder to enclose said ports and engage said seal means on said cylindrical body to stop the flow of said fluid into said tank, said cylinder is not connected to said float assembly whereby said cylinder does not lift said float assembly when said cylinder is driven by said pressure differential.

* * * * *

UNITED STATES PATENT AND TRADEMARK OFFICE
CERTIFICATE OF CORRECTION

PATENT NO. : 4,483,367

DATED : Nov. 20, 1984

INVENTOR(S) : Herbert G. Ross, Jr.

It is certified that error appears in the above-identified patent and that said Letters Patent is hereby corrected as shown below:

Column 10, line 48, change "parts" to --ports--.

Signed and Sealed this

Fifteenth Day of October 1985

[SEAL]

Attest:

DONALD J. QUIGG

Attesting Officer

Commissioner of Patents and Trademarks—Designate